United States Patent [19]
Bayer et al.

[11] Patent Number: 5,992,946
[45] Date of Patent: Nov. 30, 1999

[54] ABS PUMP CONNECTOR

[75] Inventors: Michael H. Bayer, White Lake; Christopher D. Walker, Clarkston, both of Mich.

[73] Assignee: ITT Manufacturing Enterprises, Inc., Wilmington, Del.

[21] Appl. No.: 08/994,062

[22] Filed: Dec. 19, 1997

[51] Int. Cl.$^6$ .................................. B60T 8/00; B60T 8/32
[52] U.S. Cl. ...................... 303/113.1; 303/10; 303/116.4; 303/119.3; 439/34
[58] Field of Search .............................. 303/119.3, 119.2, 303/113.1, 116.4, 116.1, 10; 137/884; 439/76.2, 76.1, 34, 80, 682, 692, 891, 82, 345, 405, 502, 494, 599, 825, 83, 936, 67; 361/785, 761, 803, 801, 789, 767, 768, 791, 736, 749, 752, 755, 796, 733.1

[56] References Cited

U.S. PATENT DOCUMENTS

| | | |
|---|---|---|
| 3,524,108 | 8/1970 | English . |
| 3,568,001 | 3/1971 | Straus . |
| 3,820,061 | 6/1974 | Holden . |
| 4,029,378 | 6/1977 | Bolis . |
| 4,217,024 | 8/1980 | Aldridge et al. . |
| 4,392,181 | 7/1983 | Jabben . |
| 4,842,525 | 6/1989 | Galloway et al. . |
| 4,952,158 | 8/1990 | Nakagawa . |
| 5,022,717 | 6/1991 | Heibel et al. . |
| 5,040,853 | 8/1991 | Burgdorf et al. . |
| 5,055,073 | 10/1991 | Yamada et al. . |
| 5,137,455 | 8/1992 | Moerbe et al. . |
| 5,288,141 | 2/1994 | Isshiki et al. . |
| 5,407,260 | 4/1995 | Isshiki et al. . |
| 5,427,542 | 6/1995 | Gerow . |
| 5,449,226 | 9/1995 | Fujita et al. . |
| 5,452,948 | 9/1995 | Cooper et al. . |
| 5,466,055 | 11/1995 | Schmitt et al. . |
| 5,509,821 | 4/1996 | Small et al. . |
| 5,549,344 | 8/1996 | Nishijima et al. . |
| 5,700,071 | 12/1997 | Steffes et al. ......................... 303/119.2 |
| 5,716,233 | 2/1998 | Muzslay .................... 439/595 |
| 5,722,742 | 3/1998 | Reihartz et al. ...................... 303/119.2 |
| 5,735,697 | 4/1998 | Muzslay .................... 439/83 |
| 5,785,394 | 7/1998 | Volpe et al. ......................... 303/113.1 |
| 5,885,113 | 3/1999 | Bricand ................................ 439/733.1 |

FOREIGN PATENT DOCUMENTS 105877 5/1991 Japan .

Primary Examiner—Douglas C. Butler
Attorney, Agent, or Firm—Rader, Fishman & Grauer PLLC

[57] ABSTRACT

A connector is disclosed for providing power to a pump from a circuit in an ABS braking unit. The electrical connector includes a generally cylindrical housing having first and second ends and a length corresponding to the perpendicular distance between the circuit and the pump. In one embodiment, the first end includes a plurality of pins resiliently mounted therein and electronically connected to the second end. The pins are adapted to resiliently engage a corresponding plurality of pads mounted on the circuit for transmitting power to the second end. In a second embodiment, the second end of the connector also includes a plurality of pins resiliently mounted therein and adapted to engage a corresponding plurality of pads mounted on the pump for receiving power transmitted from the first end.

11 Claims, 3 Drawing Sheets

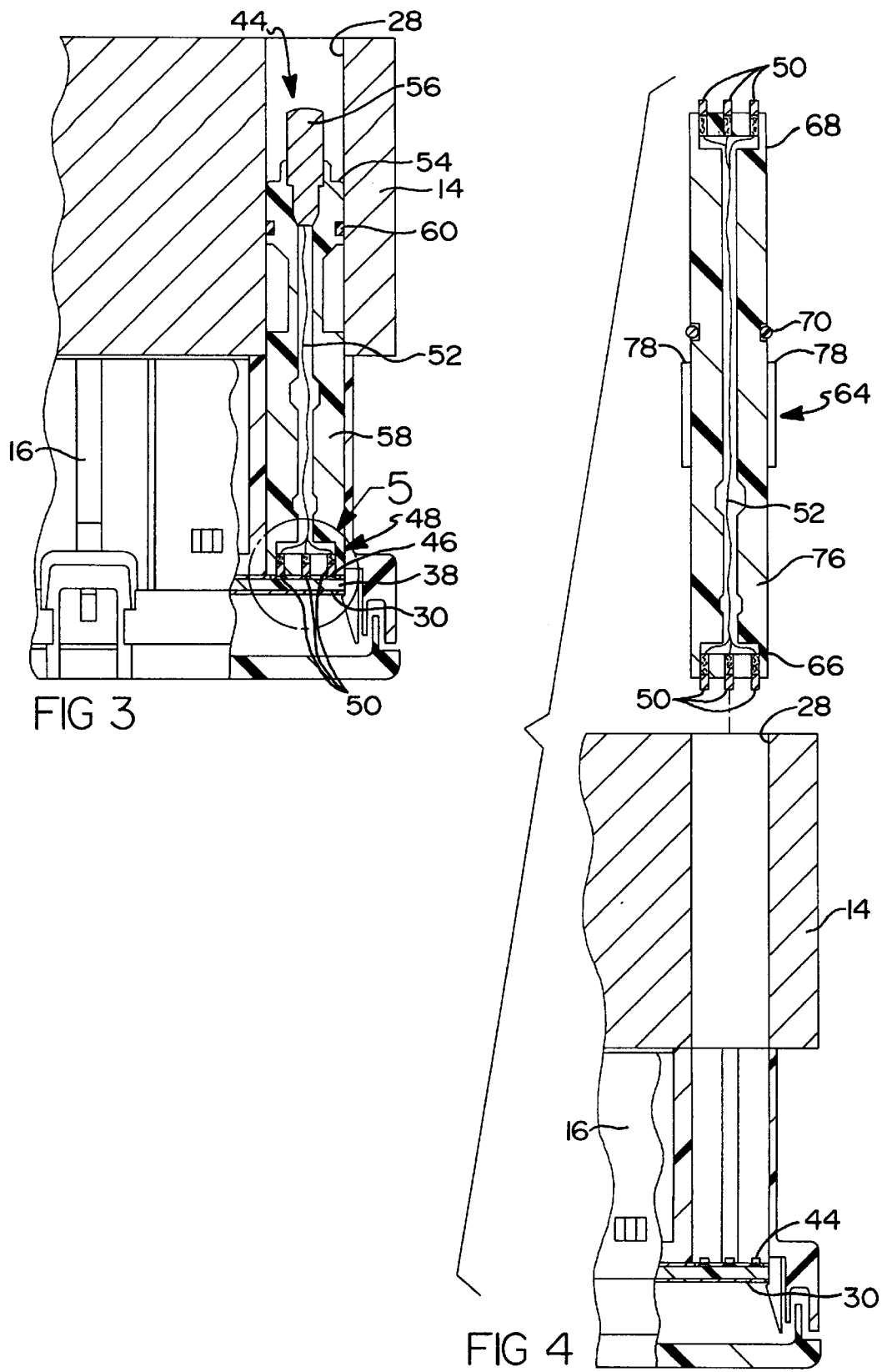

ABS PUMP CONNECTOR

CROSS-REFERENCE TO RELATED APPLICATION

This invention is related in certain respects to U.S. application Ser. No. 08/994,900 filed Dec. 19, 1997, identified as attorney docket no. ATUS 4582 entitled "ABS PUMP CONNECTOR", assigned to the assignee of the present application by inventor M. Bayer and filed on even date herewith.

FIELD OF THE INVENTION

The present invention relates to an internal pump connector for use in a system such as an anti-lock braking system (ABS) on an automobile. More particularly, the invention relates to a removable connector for providing power to an ABS pump from a circuit of an electronic control unit during ABS utilization.

BACKGROUND OF THE INVENTION

Modern anti-lock braking system (ABS) control units are constructed to minimize weight and space requirements of the unit. Current ABS units include three major parts: an electronic control unit; a hydraulic control unit; and an ABS pump. Typically, the ABS pump is spaced away from the electronic control unit by the hydraulic control unit. In order for the electronic control unit to supply power to the ABS pump during system activation, the pump must be electrically connected to a circuit within the electronic control unit. Past designs have used cables which are located exterior of the hydraulic control unit to electrically connect between pump and circuit. Electrical connections exterior of the hydraulic control unit are subjected to severe environmental conditions which may lead to degradation of the electrical connection and system performance. These cables may also be inadvertently disconnected due to jarring or vibration. Known designs also use electrical connections between the circuit and ABS pump which extend perpendicular from the circuit of the electronic control unit through an aperture in the hydraulic control unit to the pump. These electrical connections internal to the hydraulic control unit are fastened or fixed to the printed circuit through a soldering process at the time the electronic control unit is manufactured. The connection fixed to the circuit of the electronic control unit must therefore be adapted to pass through a hydraulic control unit and to establish an adequate connection to the ABS pump when the ABS system is assembled.

In current practice, the electronic control unit, the hydraulic control unit and the ABS pump are manufactured by different suppliers, and are assembled together at another location. Current electronic control unit designs require that any fixed electrical connection be soldered to the printed circuit of the electronic control unit, after which the fixed connection is sealed from the exterior environment. As a result, the pump electrical connector is attached to the printed circuit at the time the electronic control unit is assembled, before the electronic control unit is shipped to a final location for assembly into an ABS unit. Because fixed electrical connectors protrude perpendicularly from the electronic control unit, shipping precautions dictate the use of extra packaging space for shipping electronic control units to assembly points to prevent damage to the electronic control unit. Nevertheless, shipping and handling damage to the connector extending perpendicularly from the electronic control unit housing frequently occurs. Moreover, fixing and sealing the pump electrical connector increases the complexity of the electronic control unit manufacture process. In particular, the connector first must be soldered or otherwise fixed to the printed circuit during manufacture of the electronic control unit. Because power requirements of the ABS pump are large, the connector must be capable of transmitting the necessary power. As a result, the electrical contact between the printed circuit and the electrical connector may be relatively large and secure. In particular, soldering integrity between the printed circuit and the connector becomes very complex as the area of the connection increases, requiring increased heat and manufacturing attention in order to achieve a robust electrical connection. Also, once the connector is fixedly attached to the printed circuit, the attachment must be sealed from external environmental conditions. Typically, after the electrical connector is attached to the printed circuit, a seal is molded in place about the electrical connector which forms a seal between the connector and the housing of the electronic control unit. Molding this seal requires an additional manufacturing step, the integrity of which must be monitored closely to prevent unit failure during service lifetime.

Current designs of electrical connectors between ABS pump and electronic control units also limit serviceability of the ABS unit. Because the electrical connection is soldered to a printed circuit and then molded in place, the electrical connector is not a replaceable part. Should the electrical connection ever fail, due to environmental conditions or manufacturing defects, the entire electronic control unit would have to be replaced rather than simply replacing the electrical connector.

SUMMARY OF THE INVENTION

The present invention is directed to an anti-lock braking system of the type having an electronic control unit with a printed circuit which provides power to a pump, where the pump is separated from the electronic control unit by a hydraulic control unit. A connector is disclosed for providing power to the pump from the printed circuit. The electrical connector includes a generally cylindrical housing having first and second ends and a length corresponding to the perpendicular distance between the printed circuit and the pump. In one embodiment, the first end includes a plurality of pins resiliently mounted in the first end and electronically connected to the second end. The pins are adapted to resiliently engage a corresponding plurality of contact pads mounted on the printed circuit for transmitting power to the second end. In a second embodiment, the second end of the connector also includes a plurality of pins resiliently mounted in the second end and adapted to engage a corresponding plurality of contact pads mounted on the pump for receiving power transmitted from the first end.

The removable connector of the present invention overcomes disadvantages of conventional ABS pump electrical connections. The electronic control unit need not be fabricated with a permanently attached connector for the pump soldered to the printed circuit. As a result, packaging space for shipping is minimized, as is the possibility for damage during shipping and handling to the connector extension. The electrical connector seal may be built into the generally cylindrical housing of connector of the present invention, thereby removing a molding and sealing step from the manufacture of the electronic control unit. The present inventive connector is also not soldered to the printed circuit of the electronic control unit, removing the possibility for poor electrical connection or failure of the electrical connection to the printed circuit due to environmental conditions or shock damage to the connector during shipping or installation. Serviceability of the electronic control unit is also enhanced through the use of a detachable or removable internal connector to the pump.

BRIEF DESCRIPTION OF THE DRAWINGS

The features and inventive aspects of the present invention will become more apparent upon reading the following detailed description, claims, and drawings, of which the following is a brief description:

FIG. 3, is a cross-sectional view of a first embodiment of an electrical connector of the present invention;

FIG. 4, is an exploded view of a second embodiment of the present invention;

DETAILED DESCRIPTION OF A PREFERRED EMBODIMENT

Figure 1:
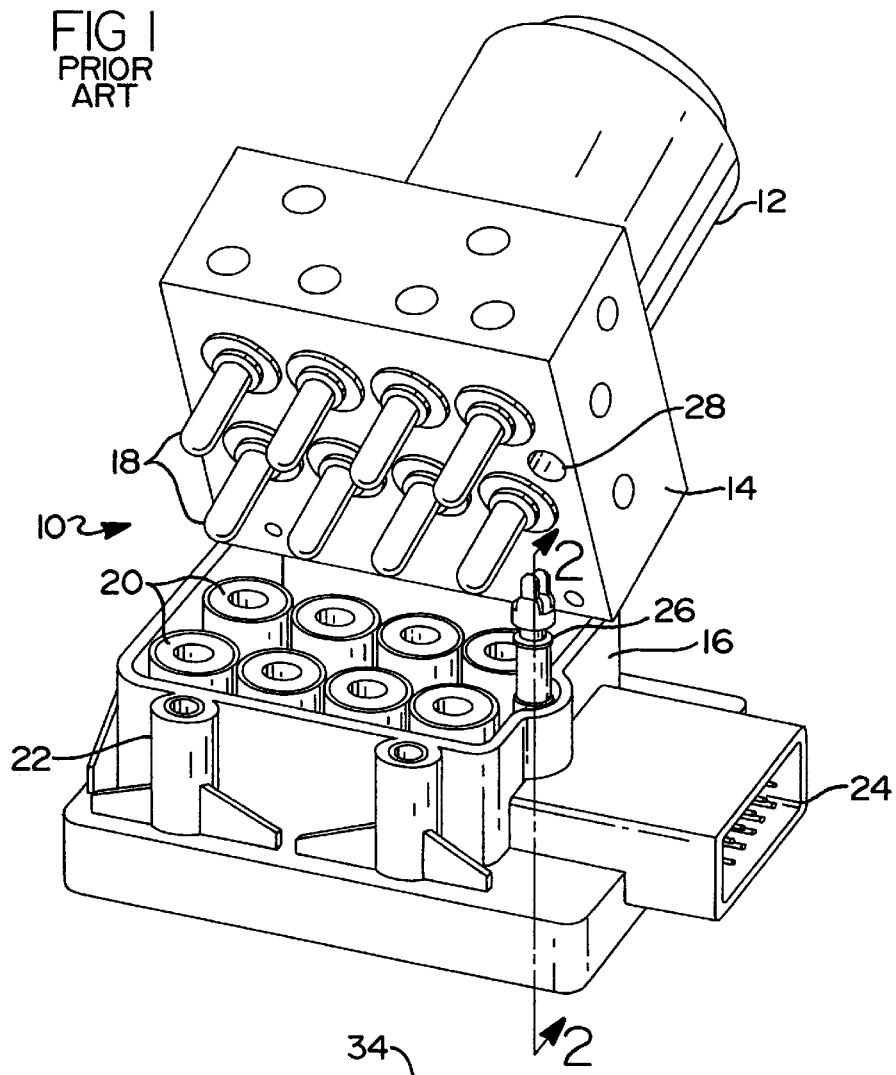
FIG. 1, is a view of a prior art ABS unit with an electronic control unit shown partially removed from a hydraulic control unit and a pump to depict a prior art electrical connector between a printed circuit and the ABS pump.

FIG. 1 displays a prior art electronically controlled hydraulic unit 10 which is intended for use in an automobile anti-lock braking system (ABS). As seen in FIG. 1, pump 12 is attached to hydraulic control unit 14, which is shown partially removed from electronic control unit 16. Hydraulic control unit 14 includes a plurality of valve actuators 18 which are adapted to be received within solenoid coils 20 of electronic control unit 16. Bosses 22 utilize conventional fastening members to attach the hydraulic assembly 10 into position on a host vehicle. An input/output connector 24 is located on the exterior of the electronic control unit 16 to provide for the input and output of both electrical power and signal currents to unit 10. A second electrical connector 26 extending generally perpendicularly from electronic control unit 16 forms a connection between electronic control unit 16 and pump 12 through aperture 28 in hydraulic control unit 14 to deliver power to the hydraulic pump 12.

Figure 2:
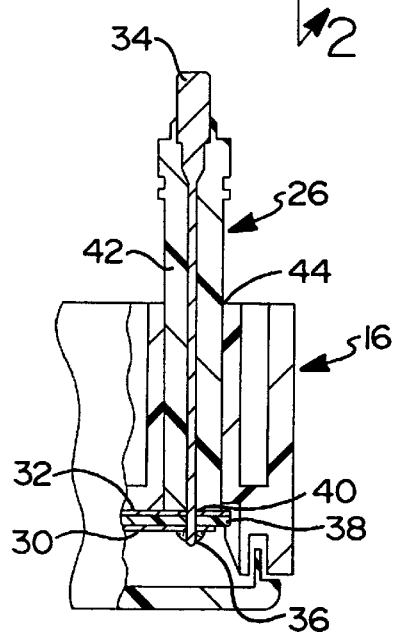
FIG. 2, is a cross-sectional view of a prior art pump connector as taken along lines 2—2 of FIG. 1.

The prior art assembly of connector 26 is further illustrated with reference to FIG. 2. Typically a printed or etched circuit 30 is mounted beneath solenoid coils 20 (not shown) within electronic control unit 16. Coils 20 are connected to printed circuit 30 to provide an electrical current to coils 20 which in turn induces a valve located with an actuator 18 to move between a seated and an unseated position. Printed circuit 30 is strengthened by being attached to a composite resin backing 38. The strength of printed circuit 30 is further enhanced through the addition of an aluminum backing plate 32, which also acts to dissipate waste heat. Prior art connector 26 includes at least one blade style terminal 34, and is long enough to reach from printed circuit 30 to the underside of pump 12. A first end 40 of blade style terminal 34 is attached directly to circuit 30, usually with solder 36. Prior to attaching first end 40 to printed circuit 30, a hole is drilled in both aluminum plate 32 and composite resin backing 38 to clear the way for first end 40 to be in contact with a solder pad (not shown) on printed circuit 30. Because of the size of first end 40 and of the heat capacity of terminals 34 in general, it is difficult to achieve a high integrity solder 36 because of the heat requirements necessary to heat both first end 40 and printed circuit 30 to a requisite temperature such that solder 36 adheres to circuit 30. After first end 40 is soldered to printed circuit 30, a seal 42 is injection molded about terminals 34 to prevent external environmental conditions from impacting or affecting the performance of circuit 30 and connector 26. Moreover, care must be taken with molded seal 42 at neck 43 of electronic control unit 16 where connector 26 emerges from the top of electronic control unit 16. If molded seal 42 does not completely seal at neck 43, then circuit 30 may be exposed to environmental elements which may lead to premature degradation of solder 36 at circuit 30. After seal 42 is molded about terminals 34, connector 26 is fixed in position and perpendicularly projects a distance above the top of electronic control unit 16 generally equal to the thickness of hydraulic control unit 14. There is thus potential for damage to connector 26 when shipping the finished electronic control unit 16 to an assembly location where it is assembled to hydraulic control unit 14 and a pump 12.

To address the shortcomings of the prior art, a first embodiment of the present invention is illustrated with reference to FIG. 3. In FIG. 3, a hydraulic control unit 14 is shown adjacent to an electronic control unit 16 in an assembled position. An aperture 28 passes through hydraulic control unit 14. A connector 44 passes through aperture 28 and makes contact with a printed circuit 30 via contact pads 46 which are mounted upon composite resin backing 38 and communicate with etched or printed circuit 30. In the first embodiment, a first end 48 of connector 44 includes a plurality of resilient pins 50. Pins 50 are resiliently mounted in the first end 48, and are electrically connected 52 to a second end 54 of connector 44. Second end 54 includes blade style terminals 56 which are adapted to connect to a corresponding connector on the bottom of an associated pump (not shown). Resilient pins 50, electrical connection 52 and blade style terminals 56 are all encased within a generally cylindrical connector housing 58 which is sized to provide a seal between printed circuit 30 and aperture 28. Furthermore, an O-Ring 60 is located adjacent second end 54 to further improve the seal between aperture 28 and printed circuit 30.

Figure 5:
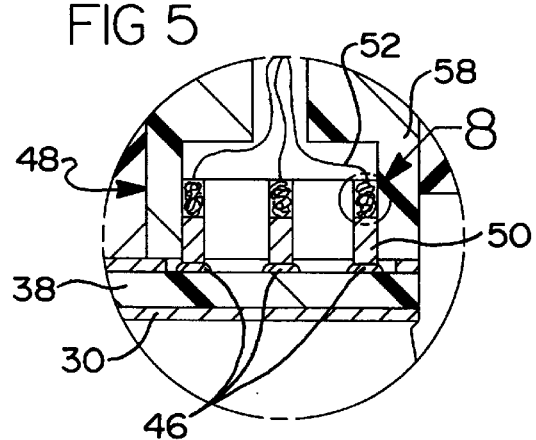
FIG. 5, is an enlarged view of circle 5 of FIG. 3, showing the connector in an engaged position.
Figure 6:
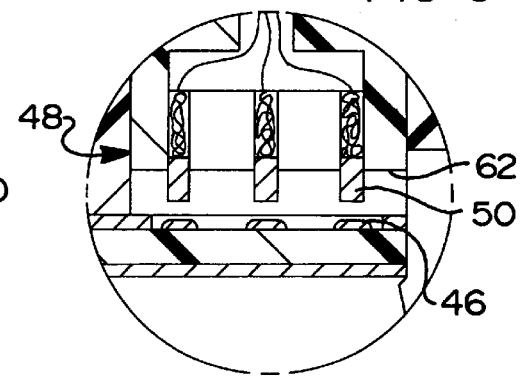
FIG. 6, is a first alternative enlarged view of circle 5 of FIG. 3 showing the connector in a disengaged position.

Contact between first end 48 of connector 44 and contact pads 46 is further described with reference to FIG. 5. As described previously, a circuit 30 is mounted upon a composite resin backing 38. A first plurality of contact pads 46 are also mounted to composite resin backing 38 and are in electrical communication with etched or printed circuit 30. A corresponding first plurality of resilient pins 50 are mounted within generally cylindrical housing connector housing 58 and engage contact pads 46 to provide an electrical connection there between. Each pin 50 is also in electrical communication with terminals 56 on second end 54 (not shown). As seen in FIG. 6, pins 50 are resiliently biased to a position slightly extending from axial end 62 of first end 48 of connector 44. But when pins 50 make contact with pads 46, contact pressure between pins and pads 46 is absorbed by pins 50 being forced axially into cylindrical housing 58. In an uncompressed configuration, shown in FIG. 6, pins 50 are designed to protrude above axial end 62 a predetermined amount, approximately 0.25 millimeters per side. By operating resilient pins 50 as plungers, a better button contact with pads 46 is achieved, resulting in better electrical connection there between.

Figure 7:
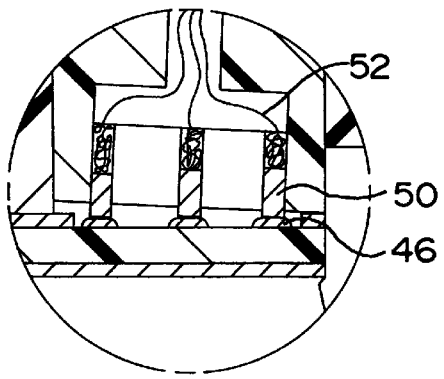
FIG. 7, is a second alternative enlarged view of circle 5 of FIG. 3 showing a resilient bias of the connector of the present invention.
Figure 8:
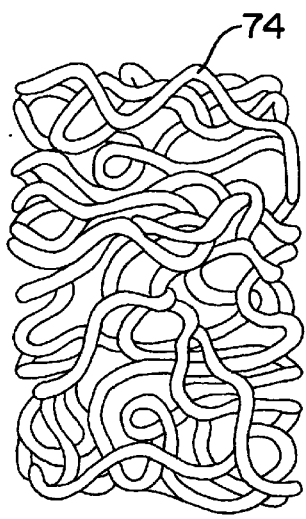
FIG. 8, is an enlarged view of circle 8 of FIG. 5.

Advantages of the resilient nature of pins 50 can be seen in FIG. 7. Connector 44 need not be arranged exactly perpendicular to circuit 30 when inserted into aperture 28. Because pins 50 are resilient, some angle of contact may occur while pins 50 still make contact with pads 46. Thus, even if circuit 30 vibrates or if electronic control unit 15 is not tightly attached to a hydraulic control unit, pins 50 will continue to make contact with pads 46, preventing the ABS unit from becoming inoperable under some situations. The resiliency of pins 50 is caused by randomly formed wire 74 behind pins 50 which supports pins 50 within cylindrical housing 58, as shown in FIG. 8. The randomness of the wire formation gives button 50 desirable resiliency, while at the same time allowing electronic connection to second end 54 of connector 44.

Returning to FIG. 4, a second embodiment of a connector 64 is shown in an exploded view. Connector 64 includes a plurality of resilient pins 50 located at both first end 66 and second end 68. Connector 64 is designed to fit snugly within aperture 28 through hydraulic control unit 14 and extend through electronic control unit 16 down to pads 46 mounted on printed circuit 30. In order to align pins 50 with pads 46, cylindrical housing 76 may be formed with external keys 78 which are received within slots in aperture 28 (not shown). Keys 78 align connector 64 such that all pins 50 will contact a corresponding pad 46. Connector 64 thereby provides an electrical connection 52 between first end 66 and second end 68, while providing a removable connection between circuit 30 and pump 12 (not shown). An O-Ring 70 is located intermediate first end 66 and second end 68 to improve sealing characteristics of generally cylindrical housing 72 of connector 64.

The connector of the present invention presents several advantages over known methods of transmitting power from a circuit to a pump in an ABS unit. Because the connector is removable, the electronic control unit portion of the ABS unit need not be fabricated with a permanently attached connector for the pump soldered to the circuit. With no permanent connector protruding from the electronic control unit, packaging space for shipping is minimized, as is the possibility for damage to the connector extension during shipping and handling. The electronic circuits of the electronic control unit are protected because a seal may be built into the generally cylindrical housing of connector of the present invention. Addition of a seal to the generally cylindrical housing of the connector also removes a molding and sealing step from the manufacture of the electronic control unit.

The present inventive connector is also not soldered to printed circuit of the electronic control unit, removing the possibility for poor electrical connection or failure of the electrical connection to the printed circuit due to environmental conditions or shock damage to the connector during shipping or installation. Serviceability of the electronic control unit is also enhanced through the use of a detachable or removable internal connector to the pump.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. In an anti-lock braking system having an electronic control unit with a printed circuit which provides power to a pump, the pump separated from the electronic control unit by the interposition of a hydraulic control unit, a removable connector for transmitting power from the circuit to the pump through an aperture in the hydraulic control unit, comprising:

a generally cylindrical housing having first and second ends and having a length corresponding to the perpendicular distance between the circuit and the pump, said first end including a first plurality of pins resiliently mounted in said first end and electrically connected to said second end, said first plurality of pins adapted to resiliently engage a corresponding first plurality of pads mounted on the circuit.

2. The anti-lock braking system as in claim 1, wherein said second end includes at least one blade style terminal connector for electronically connecting to the pump.

3. The anti-lock braking system as in claim 2, wherein said housing provides a seal between the pump and the circuit.

4. The anti-lock braking system as in claim 1, wherein said second end includes a second plurality of pins resiliently mounted in said second end and electronically connected to said first end, said second plurality of pins adapted to resiliently engage a corresponding second plurality of pads mounted on the pump.

5. The anti-lock braking system as in claim 4, said first plurality equals said second plurality.

6. The anti-lock braking system as in claim 5 wherein each pin of said first plurality of pins is electrically connected with a corresponding pin of said second plurality of pins to form an electrical connection between said first and second ends.

7. The anti-lock braking system as in claim 6, wherein said cylindrical housing includes at least one key for aligning said housing within said aperture.

8. The anti-lock braking system as in claim 1, wherein each pin of said first plurality of pins is supported by a single randomly formed wire within said first end, said wire providing said electrical connection to said second end.

9. In an anti-lock braking system having an electronic control unit with a printed circuit which provides power to a pump, the pump separated from the electronic control unit by the interposition of a hydraulic control unit, a removable connector for transmitting power from the circuit to the pump through an aperture in the hydraulic control unit, comprising:

a generally cylindrical housing having first and second ends and having a length generally corresponding to the perpendicular distance between the circuit and the pump, said first end including a first plurality of pins resiliently mounted in said first end, wherein each of said pins is connected to and resiliently supported by a single randomly formed wire within said first end and electrically connected to said second end, said first plurality of pins adapted to resiliently engage a corresponding first plurality of pads mounted on the circuit.

10. The anti-lock braking system as in claim 9, wherein said second end includes a first plurality of pins, wherein each of said pins at said second end is electrically connected to a corresponding pin of said first end by said wire, said wire being randomly formed for resiliently supporting said pins in said second end, said second end pins adapted to resiliently engage a corresponding first plurality of pads mounted on the pump.

11. The anti-lock braking system as in claim 10, wherein said cylindrical housing includes at least one key for aligning said pins with said pads.

\* \* \* \* \*